(12) United States Patent
Gallarda et al.

(10) Patent No.: US 9,579,620 B2
(45) Date of Patent: Feb. 28, 2017

(54) METHOD TO HOMOGENIZE THE TUBE TEMPERATURES BETWEEN TUBES DURING PROCESSES INVOLVING HEATING OF GAS FLOWING IN THE TUBES

(71) Applicant: L'Air Liquide, Societe Anonyme Pour l'Etude et l'Exploitation des Procedes Georges Claude, Paris (FR)

(72) Inventors: Jean Gallarda, Joinville le Pont (FR); Frederic Camy-Perret, Paris (FR); Julien Cances, Frankfurt-am-Main (DE); Antoine Hsu, Paris (FR); Jacques Segret, Paris (FR); Daniel Gary, Montigny le Bretonneux (FR); Patrice Levee, Maurepas (FR); Antonio Coscia, Hadamar (DE); Dirck Simons, Zandhoven (BE)

(73) Assignee: L'Air Liquide Société Anonyme Pour L'Étude Et L'Exploitation Des Procedes Georges Claude, Paris (FR)

(*) Notice: Subject to any disclaimer, the term of this patent is extended or adjusted under 35 U.S.C. 154(b) by 191 days.

(21) Appl. No.: 14/401,608

(22) PCT Filed: May 15, 2013

(86) PCT No.: PCT/EP2013/060037
§ 371 (c)(1),
(2) Date: Nov. 17, 2014

(87) PCT Pub. No.: WO2013/182392
PCT Pub. Date: Dec. 12, 2013

(65) Prior Publication Data
US 2015/0129193 A1    May 14, 2015

(51) Int. Cl.
*B01J 8/00*    (2006.01)
*C01B 3/38*    (2006.01)
(Continued)

(52) U.S. Cl.
CPC ........... *B01J 19/0013* (2013.01); *B01J 8/062* (2013.01); *B01J 19/2425* (2013.01); *C01B 3/384* (2013.01);
(Continued)

(58) Field of Classification Search
CPC .... B01J 19/0013; B01J 19/2425; B01J 8/062; C01B 3/384
See application file for complete search history.

(56) References Cited

U.S. PATENT DOCUMENTS

2007/0104641 A1* 5/2007 Ahmed .................... B01J 8/062
                                                          423/652
2008/0286706 A1    11/2008 Ponzi et al.
(Continued)

FOREIGN PATENT DOCUMENTS

EP    1216955    6/2002
FR    2850392    7/2004
(Continued)

OTHER PUBLICATIONS

EP 12305661, European Search Report, Oct. 18, 2012 (2 pp).
PCT/EP2013/060037, International Search Report and Written Opinion, Aug. 2, 2013 (6 pp).

*Primary Examiner* — Matthew Merkling
(74) *Attorney, Agent, or Firm* — Justin K. Murray

(57) ABSTRACT

The invention relates to a method for decreasing the spread of the tube temperatures between tubes in a process involving the heating of at least one fluid in a furnace that comprises at least one radiation chamber with radiant walls, at least one essentially vertical row of tubes inside of which circulate the at least one fluid to be heated, and being equipped with burners that heat the tubes, where the method comprises the steps of: determining, for each of the tubes the skin temperature of the tube, selecting the 50% tubes having the lowest temperatures determined, the process being (Continued)

stopped, realizing on each tube selected an operation that decreases the flow of the fluid distributed to said tube while keeping the total flow rate of the fluid unchanged.

10 Claims, 8 Drawing Sheets

(51) Int. Cl.
  *B01J 19/00* (2006.01)
  *B01J 8/06* (2006.01)
  *B01J 19/24* (2006.01)
(52) U.S. Cl.
  CPC ............... *B01J 2208/00044* (2013.01); *B01J 2208/00504* (2013.01); *B01J 2208/00539* (2013.01); *B01J 2208/00548* (2013.01); *B01J 2208/025* (2013.01); *B01J 2219/00087* (2013.01); *B01J 2219/185* (2013.01); *B01J 2219/2401* (2013.01); *C01B 2203/0233* (2013.01); *C01B 2203/0811* (2013.01); *C01B 2203/0816* (2013.01); *C01B 2203/1017* (2013.01); *C01B 2203/1235* (2013.01)

(56) References Cited

U.S. PATENT DOCUMENTS

| 2010/0042370 | A1* | 2/2010 | Gallarda | B01J 8/062 |
| | | | | 702/184 |
| 2010/0140552 | A1 | 6/2010 | Ammouri et al. | |
| 2010/0301274 | A1 | 12/2010 | Gallarda et al. | |
| 2014/0105243 | A1* | 4/2014 | Tait | G01K 3/04 |
| | | | | 374/102 |
| 2015/0251907 | A1* | 9/2015 | Wawrzinek | C01B 3/384 |
| | | | | 252/373 |

FOREIGN PATENT DOCUMENTS

| FR | 2911600 | 7/2008 |
| WO | WO 2009/003647 | 1/2009 |
| WO | WO 2009/057909 | 5/2009 |

\* cited by examiner

Tubes to be equiped with pressure drop devices

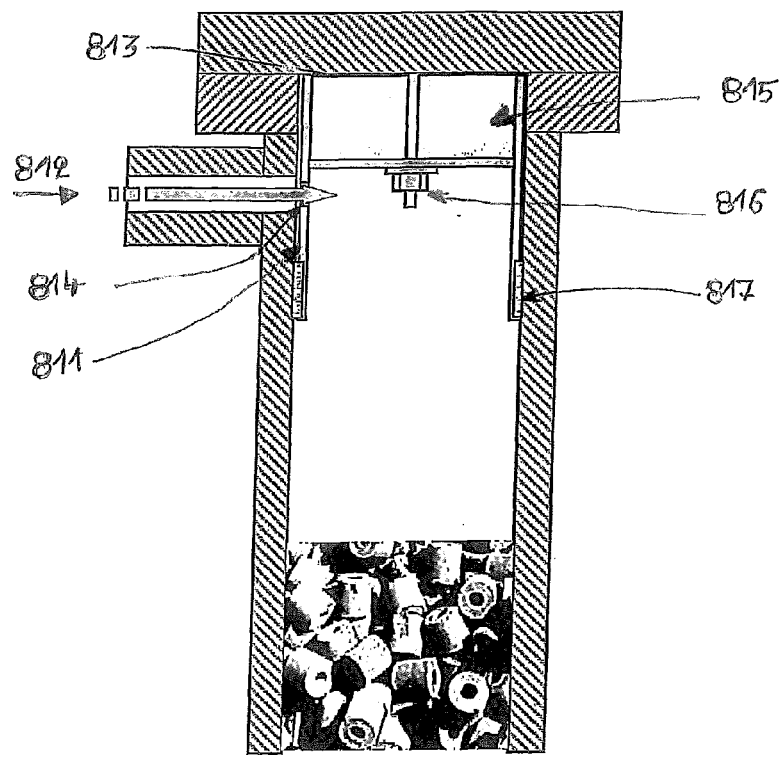
Fig. 8a
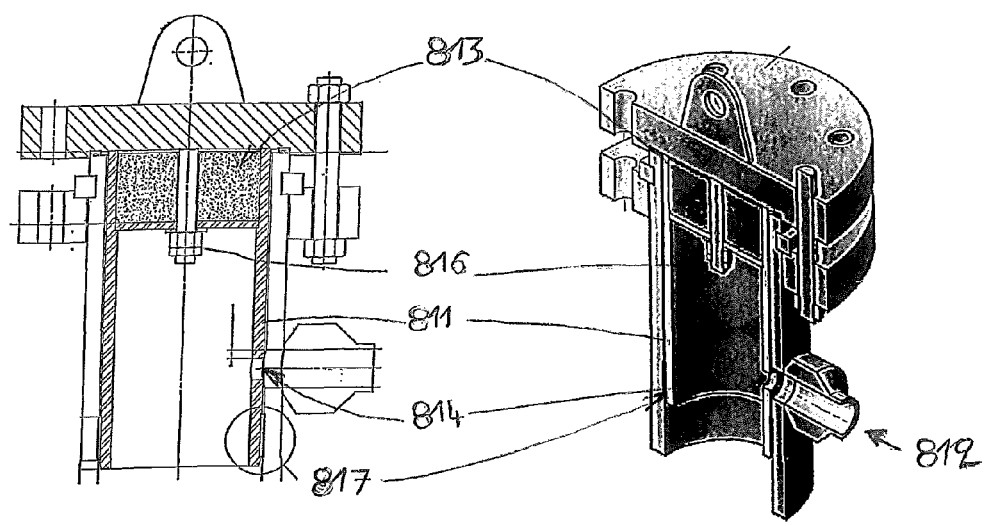
Fig. 8b
Fig. 8c

METHOD TO HOMOGENIZE THE TUBE TEMPERATURES BETWEEN TUBES DURING PROCESSES INVOLVING HEATING OF GAS FLOWING IN THE TUBES

CROSS REFERENCE TO RELATED APPLICATIONS

This application is a §371 of International PCT Application PCT/EP2013/060037, filed May 15, 2013, which claims the benefit of EP12305661.6, filed Jun. 8, 2012, both of which are herein incorporated by reference in their entireties.

TECHNICAL FIELD OF THE INVENTION

The present invention relates to processes involving the heating of fluids, such as processes for the production of gas containing hydrogen and carbon oxides by steam reforming a hydrocarbon feedstock, hydrocarbon cracking processes, and heating of fluids.

Although the invention is discussed further within the context of steam reforming of hydrocarbons, the invention is not limited to use with such processes.

BACKGROUND

Steam methane reforming is a method widely used for the production of hydrogen and/or carbon monoxide.

The steam reforming process is a well known chemical process for hydrocarbon reforming. In this process, a mixture of light hydrocarbons and steam (referred to as mixed feed or feed) reacts in the presence of a catalyst to form hydrogen, carbon monoxide and carbon dioxide. Several reactions are observed in the process, the most important chemical reaction observed in the steam reforming of light hydrocarbons—methane or natural gas (NG)—being the reaction of reforming of methane:

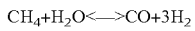

$$CH_4 + H_2O \longleftrightarrow CO + 3H_2$$

The steam methane reforming (also known as SMR) gives a mixture with hydrogen ($H_2$) and carbon monoxide (CO)—in presence of water vapor—as major components, but also $CO_2$ as a minor component, $CH_4$ as residual component and other components as traces.

The above reaction of reforming of methane with steam is an endothermic and slow reaction; it requires heat input, as well as catalyst to occur. The amount of reforming achieved depends on the temperature of the gas leaving the catalyst; exit temperatures in the range of 700°-950° C., possibly 1000° C. are typical for conventional hydrocarbon reforming.

A SMR unit is usually made of several vertical tubular reactors (or tubes) forming rows, placed in a furnace, filled with catalyst (usually in the form of pellets) and fed with a mixture of methane and steam.

Several typical furnace designs are encountered industry wide, mainly bottom, side and top fired; the two most often encountered designs are described hereafter:
- the top-fired reformer design, with the burners located on the top of the furnace. It is one of the most referenced designs and is proposed by several technology providers;
- the side fired reformer design, with the burners located in the side of the tube, on radiant wall.

The main objective of the furnace design is to allow a proper heat transfer from the burner flames to the reforming tubes, while keeping below the tube design temperature. This temperature is a function of the tube mechanical load (mainly feed gas pressure), the mechanical properties of the alloys, and the desired lifetime of the tube.

Tubes are indeed a critical element with regards with the reliability of SMR furnace operation as their operating temperature results from a compromise between two antagonist objectives: a better process performance with increased temperature and good operation reliability with limited temperature (kept below design temperature).

Therefore, the tube operating temperature is a limiting parameter for furnace operations: the reformer has to be operated while keeping even the hottest tube below the design temperature.

FIGS. 1 to 3 illustrate typical SMR furnaces.

FIG. 1 illustrates a typical top-fired SMR furnace 101, with a refractory lined firebox 102 containing several rows of vertical tubes 103 with roof burners 104 being placed in rows in-between the tube rows. Tubes are filled with catalyst. A feed 105 (process fluid mixture ($CH_4+H_2O$)) entering through inlet headers is injected into the tubes where it reacts; the process gas flows through the catalyst in the tube from top to bottom and exits—as syngas—through outlet headers. The combustion products 106 out of the burners are usually blown vertically downwards, so that tube rows face the flames in their upper part, and a flue gases collector—not shown—is usually built at the furnace floor level which gathers the combustion products.

When the firebox contains many tubes (up to several hundreds) placed in rows, and due to necessary space for construction constraints—including structural beams—each of the row of tubes is split into several sections—it may occur that the sections contain different number of tubes facing the same number of burners, while receiving same power input; therefore, the total heating power received by one tube (or tube duty) is not equal for all tubes, being usually lower in the central section than in the extremity ones.

Moreover, the tubes located at the end of a tube section receive more heat than the other tubes of the same section, the reason being that end tubes are heated from a larger angular sector compared to those neighbored by two tubes. This transfer particularity can be also observed on side-fired furnaces, as described hereafter.

FIG. 2 illustrates a typical side fired SMR furnace 201, made of a refractory lined firebox 202 containing one single row of tubes 203. The burners 204 are horizontally aligned at different levels on the furnace walls, being therefore horizontally and vertically aligned; the combustion products (flue gases) 206 flowing out of the burners are blown vertically upward. A flue gases exhaust collector (not shown) is built at the furnace roof level.

FIG. 3a simulates the temperatures of the combustion products in a side fired SMR 201, showing that the symmetry of the burner 204 distribution induces that the combustion products (flue gases) converge to the center 307 of each square burner, thus creating a hot point. At this convergence point, the flow is forced into a re-circulation perpendicularly to the refractory towards the tubes 203; because just downstream the flames, the re-circulated gases are extremely hot, and induce hotspots 308 formation on the tubes impacted which constitutes a main drawback.

Taking into consideration the following points: (1) the process gas within the tubes flows from the top to the bottom of the firebox, counter currently to the flue gas flow, (2) the furnace is designed in order to distribute homogeneously the process gas to all the tubes, and (3) the process gas temperature increases during its flowing down along the tube length; this results, for each tube, in a tube temperature globally higher in the lower part of the furnace. Thus, the risk for tube damaging if the design temperature is exceeded is higher in this part of the tube.

This diagnosis of the problem results from simulation and is also confirmed by experimental tube temperature measurement profiles.

FIG. 3b illustrates the tubes temperatures and shows hot spots present in side fired furnace; a clear periodic pattern is identified, with hottest tubes being in the middle part between two burner rows and the cold tubes being in front of the burners.

In the case of the side-fired furnaces—as described above—the recirculation effect due to flue gas convergence implies that the tubes between the burner columns are more heated than the tubes situated right in front of the burners.

For the top fired furnaces as well, construction constraints imply that the tube duty is not identical for all the tubes in the combustion chamber.

There have been a number of attempts to improve the uniformity of the heating of the tubes in reformers.

It is known from FR 2850392 a process for the heat treatment of a hydrocarbon feedstock in which the feedstock to be treated circulates inside an exchange tube bundle that receives the heat emitted by radiant burners; the burners being placed in rows, —horizontally and vertically—the vertical firing profile is adapted so as to obtain determined heating profiles. A main drawback of this solution is a high investment cost with strong modification of the existing devices.

It is known from EP 1216955B the use of a variable heat flux side-fired burner system for use in processes for heating, reforming, or cracking hydrocarbon fluids or other fluids. In order to be flexible, the burner may be divided into multiple sections, flow rates being distributed for example along perforated plates with predetermined firing patterns. A main drawback of this solution is a high investment cost with strong modification of the existing devices; additionally, the solution does not avoid recirculation phenomena.

It is known from FR 2911600 a process for reforming hydrocarbons in a side-fired furnace, where the power of each burner is adjusted, burners of high power being placed near from burners of low power so as to reduce the accumulation of hot points on tubes.

It is known from US 2008286706 a heater and method of operation suitable for the cracking of hydrocarbons with under-stoichiometric firing in upper wall burners and over stoichiometric firing in the floor (hearth) wall burners to achieve the smoothest (flat) profile along the overall process length.

However, the solutions proposed by the prior art to achieve a more uniform heating of the tubes only attempt to mitigate the heat flux discrepancies from the combustion chamber side—either burner or flue gases or both of them.

Furthermore, prior art documents consider mainly the in-homogeneities of the temperature of a tube from top to bottom, but fail to take into account the tube temperature in-homogeneities between tubes. As a consequence, the solutions of the prior art fail to solve the problems of overheating of some tubes of the reformer compared to other tubes in the same reformer.

There is therefore a need for a solution that identifies the hottest and the coldest tubes in a furnace, and homogenizes the temperatures of all the tubes;

there is a need for a solution of the above problem that can be implemented on reformers in new installations, and on existing reformers during programmed shut down;
there is a need for a solution of the above problem that is a cheap solution and that does not impact negatively the production.

SUMMARY OF THE INVENTION

An object of the invention is to reduce the temperature of the hottest tubes—and consequently increase their life time and reliability—not by decreasing the heat externally received by said tubes, but by increasing their cooling, thanks to higher feed flowing into said hottest tubes, while in the meantime coldest tubes receive less feed flow. Due to the endothermicity of the reaction inside the catalyst tube, a higher feed flow increases the cooling of the hottest tubes, while a lower feed flow decreases the cooling of the coldest tubes. Thus, the temperatures of the tubes are homogenized (i.e., the tube temperatures spread between tubes is decreased).

Another object of the invention is to run the furnace at higher product gas temperature level, i.e. higher performances, while keeping below the temperature design.

The invention proposes a method to homogenize—by decreasing the spread of—the tube temperatures between tubes in a process involving the heating of at least one fluid in a furnace that contains at least one radiation chamber with radiant walls, at least one essentially vertical row of tubes (tubular reactors) inside of which circulates the at least one fluid to be heated, and whereby said radiation chamber is equipped with burners that are used in the form of rows,
whereby the at least one fluid to be heated is distributed uniformly to the tubes, whereby the burners heat the tubes,
characterized in that the method comprises the steps of:
a) determining, for each of the tubes the temperatures of the tube,
b) selecting the 50% tubes having the lowest temperatures as determined according to step a),
c) the process being stopped, realizing on each tube selected during step b) an operation that decreases the flow of the fluid distributed in said tube,
d) keeping the total flow rate of the fluid unchanged, therefore distributing uniformly increased flow to the remaining tubes.

By "the process being stopped" in step c), it is to be understood that the operation of step c) is to be realized during a shut down of the installation. It is preferably realized before commissioning (i.e. before the first start up in case of a new installation), or during a programmed shut down in case of modification of an existing installation.

The invention distributes the fluid in the tubes so as to reduce the tube temperature differences between the tubes. The temperatures of the hottest tubes are decreased, while the temperatures of the coldest ones are increased. After having identified the in-homogeneities of the tubes temperatures, the fluid flow rate is modulated. Without changing the total fluid flow rate, its distribution through the tubes is modulated as follows: in order to increase the fluid flow rate in the 50% hottest tubes, the fluid flow rate is decreased in the 50% less heated ones.

The number N of the tubes can be an odd number, in that case, the 50% tubes having the lowest temperatures is intended to be either 50% of N+1 tubes, the remaining 50% tubes having the hottest temperatures being in that case (N−1)/2 of the tubes, or 50% of N−1, the remaining 50% tubes having the hottest temperatures being in that case (N+1)/2.

Thanks to the method of the invention that homogenizes the temperatures in the fired-heaters multi-tube reactors by adjusting individually the process gas flow rates in each tube so that the heat extraction from process is adjusted to match with the local heat transfer available from the unevenly fired combustion chamber, the adjustment of the flow rates may be done such that the spread of the temperatures is reduced between the tubes i.e., the tubes exposed to higher heat fluxes are fed with more process gas than the ones receiving less heat flux.

The temperatures of the tubes may be determined by a simulation of the behavior of the furnace during said process involving the heating of the fluid. A precise determination of the heating power received by the tubes can be performed through detailed 3D fluid dynamic computations of the furnace. The individual tube flow rate distribution can then be set accordingly to the individual tube duty computed using computational fluid dynamics (CFD) analysis so that the flow rate departure from the average value is proportional to the heat flux departure from the average.

It is also possible to determine the temperatures of the tubes by measuring the skin temperature of the tubes by pyrometer measurement. By measuring the skin temperatures of the tubes in industrial scale furnace sites, experimental temperature profiles can be established, either alone or in addition to simulation.

Preferably, the spread of the temperatures is decreased so that the difference between the temperature of the hottest tube and the coldest tube is decreased by at least 20%, preferably 30%, and more preferably 40% or more.

Preferably, the operation of step c) that decreases the flow of the fluid entering in each of the tubes selected during step b) comprises in increasing the pressure drop of said 50% tubes having the lowest tube temperature.

Pressure drop may be increased by installing specific elements that induce pressure drop into or at the inlet and/or at the outlet ends of each of the 50% tubes selected in step b), said elements that induce pressure drop being sized so that the flow distribution is the one required by step d) of the method.

Said elements installed to induce additional pressure drop, therefore increasing pressure drop are based on calibrated orifices and installed at the inlet of the tubes.

The process may use tubes filled with catalyst. Advantageously, said installed elements in each of the individual tubes having the lowest temperature selected in step b) may be individually adjusted catalyst packed bed inside the tubes, including an additional catalyst bed height.

Alternatively, said installed elements into the individual tubes selected in step b) may be individually filled catalyst packed bed inside the tubes, with part of the catalyst bed height composed of a different kind of pellets with higher pressure drop characteristics than the catalyst filled in the non selected tubes.

The feed flow rate adjustment which results from the implementation—either alone or in combination—of any of the above installed elements (or any other elements that gives the same result) allows lowering the tube temperature spread.

Decreasing the spread of the tube temperatures makes it possible to either maintain the average temperature unchanged, and therefore increase the tubes lifetime—thanks to the decrease of the temperature of the hottest tubes) and/or running the furnace at higher temperature level—while keeping the temperature of the hottest unchanged, or slightly decreased—leading to higher performances.

The method of the invention is particularly advantageous where the process is a synthesis gas production process by steam reforming of a hydrocarbon feedstock using tubes filled with catalyst and where the at least one fluid distributed uniformly to the tubes being a mixture containing at least said hydrocarbon feedstock together with steam.

The method of the invention is particularly suitable for side fired furnace, it is also advantageous in the case of top fired furnaces, and may of be used in any kind of reformers containing tubes.

According to another aspect, the invention concerns a reformer for the production of synthesis gas by steam methane reforming of a hydrocarbon feedstock suitable for applying the above method, containing at least:
  a radiation chamber with vertical radiation walls, equipped with
    at least one essentially vertical row of tubes in which circulates a mixture containing at least said hydrocarbon feedstock together with steam fluid to be heated, and
    rows of burners to heat the tubes,
  means for distributing uniformly said mixture to the tubes,
  characterized in that the 50% of the tubes selected according to the method are equipped with elements suitable for increasing pressure drop installed in the tube, said elements being sized so that the flow distribution is the one required by the method.

According to a preferred embodiment, said elements suitable for increasing pressure drop installed in the tubes selected are elements based on calibrated orifices that are installed at the inlet of the tube.

According to another preferred embodiment, said elements suitable for increasing pressure drop installed are individually adjusted catalyst packed bed inside the tubes, including additional catalyst bed height.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIGS. 8 to 12 illustrate the upper part of the 50% of the tubes tuned according to the invention, in which:

FIG. 8a, FIG. 8b FIG. 8c illustrate the pressure drop device implemented in the 50% tubes to be tuned according to the example;

FIG. 10 illustrates another variant of a pressure drop device to be implemented in side fired furnaces;

FIG. 11 illustrates the case of top fired furnace;

DETAILED DESCRIPTION

The hereafter example refers to an industrial side fired reformer for a production of a synthesis gas for a final CO production. The furnace contains 32 tubes (two sections of 16 tubes); improving temperature distribution in a plant producing CO will allow either to increase operating temperature (5 to 10° C.) and thus to make CO production more efficient or to increase tubes life at same operating temperature. As a matter of fact, most of the time, the performances of CO plants are limited by the operating temperature.

Figure 1:
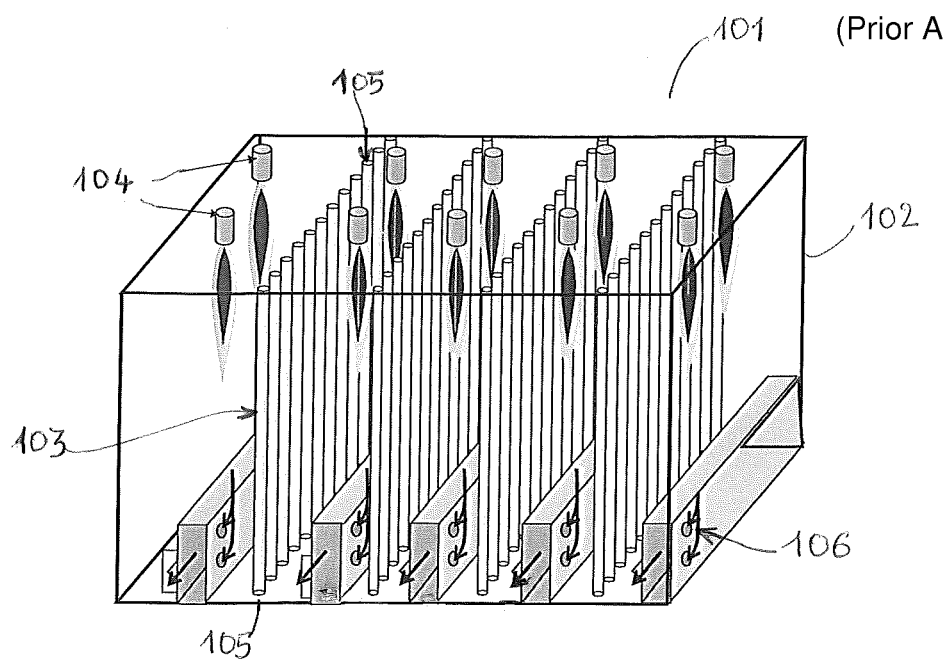
FIG. 1 illustrates a typical SMR furnace of the prior art.
Figure 2:
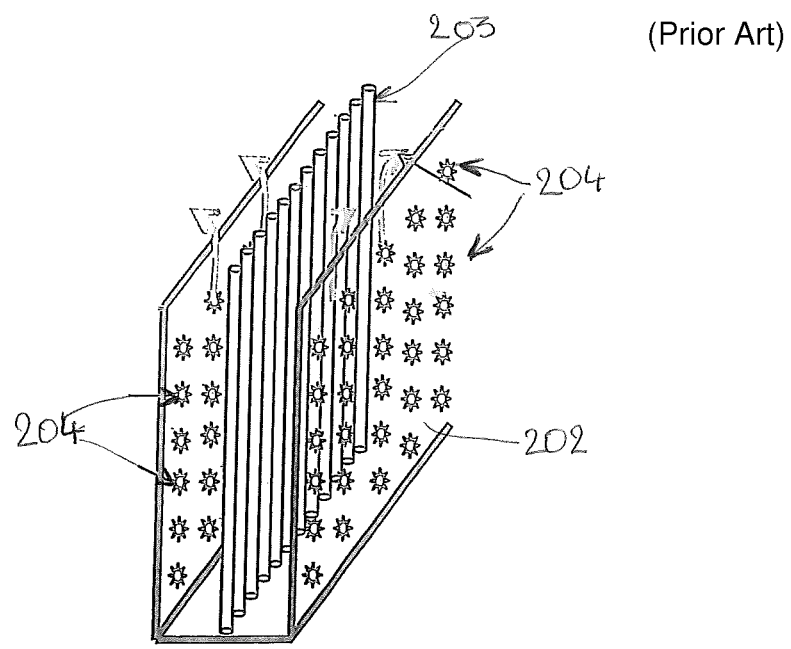
FIG. 2 illustrates a typical SMR furnace of the prior art.
Figure 3A:
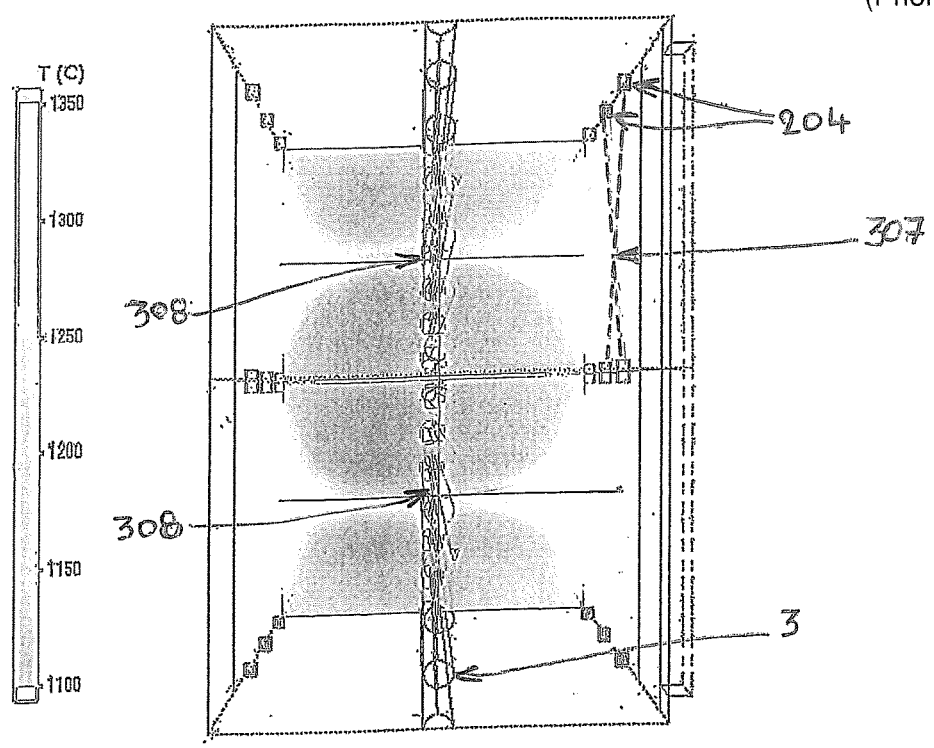
FIGS. 3a and 3b provide simulated data for the SMR furnace shown in FIG. 2.
Figure 3B:
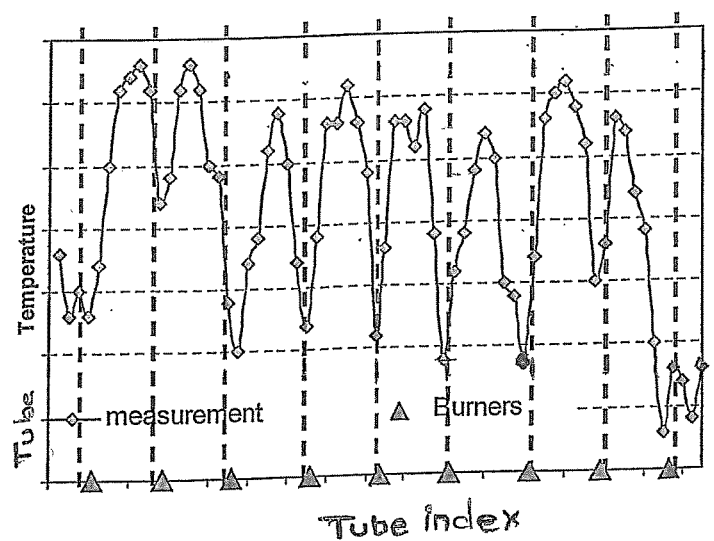
Figure 4:
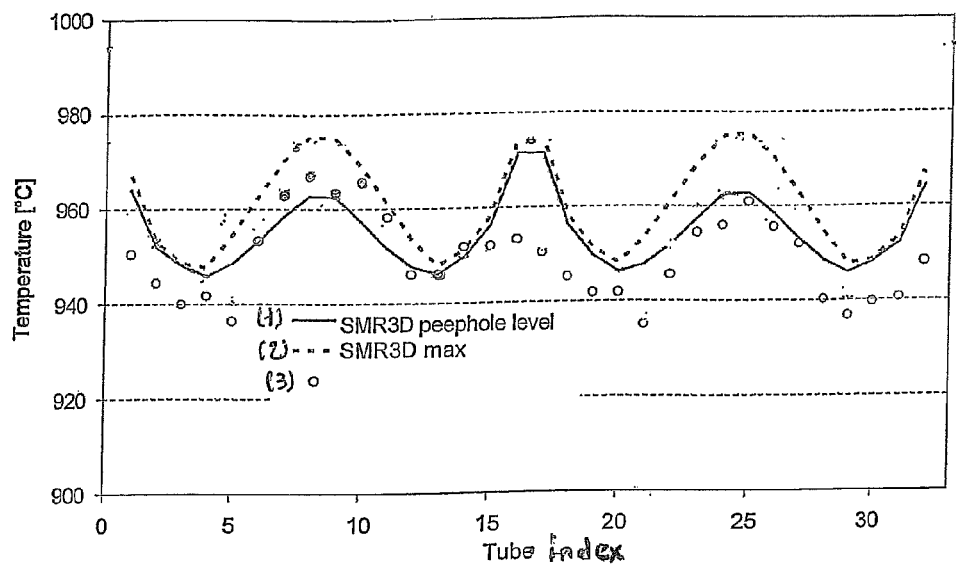
FIG. 4 shows the measured and simulated temperatures of the tubes before applying the tuning according to the invention.

FIG. 4 shows the temperatures of the 32 tubes when the feedstock is evenly distributed in the tubes. For each tube, temperatures are presented which result from:

(1): SMR3D computation at peephole level;

(2): SMR3D computation max, which represents the maximum tube temperature for each tube (which takes also into account the perturbation induced by the peep hole)

(3): measurements made using a pyrometer;

The comparison between the values measured or calculated shows that despite some differences, comparable trends are observed.

Figure 5:
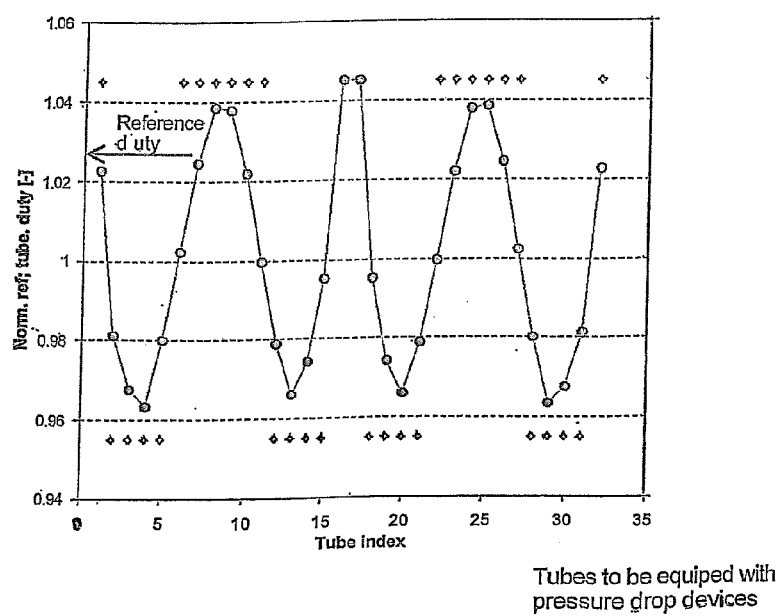
FIG. 5 illustrates the hot tubes identification before applying the tuning according to the invention.

FIG. 5 shows the tube duty normalized profile, extracted from computation results before the implementation of the flow regulation devices. The 50% tubes (16 tubes) that receive higher duty are identified and selected to be cooled down (the 16 coldest tubes will receive a smaller process flow).

This determination of the heat flux received by the tubes has been obtained by computation; as seen above on FIG. 4, by measuring the temperature of the tubes using a pyrometer during operations, the same hot and cold tubes could also have been identified According to the invention, these 50% tubes are cooled down by receiving a higher feed flow.

As described previously, the recirculation effect due to flue gas convergence implies that the tubes between the burner columns are more heated than those in front of the burners. This is also clearly visible on FIG. 5 where the central horizontal line represents the normalized tube duty (i.e. tube duty divided by the averaged duty for the whole firebox), where the hottest tubes tend to be situated in the middle between two burners while the coldest ones are in front of the burners.

The overall furnace is operated under the constraint of the hottest tube that should not exceed the design temperature.

By applying the method of the invention, the distribution of the process gas flow in the tubes is adjusted in order to reduce temperature differences tube to tube while keeping the total flow unchanged: the feed gas flow rate is increased in the more heated tubes, and is decreased in the less heated ones.

Figure 6:
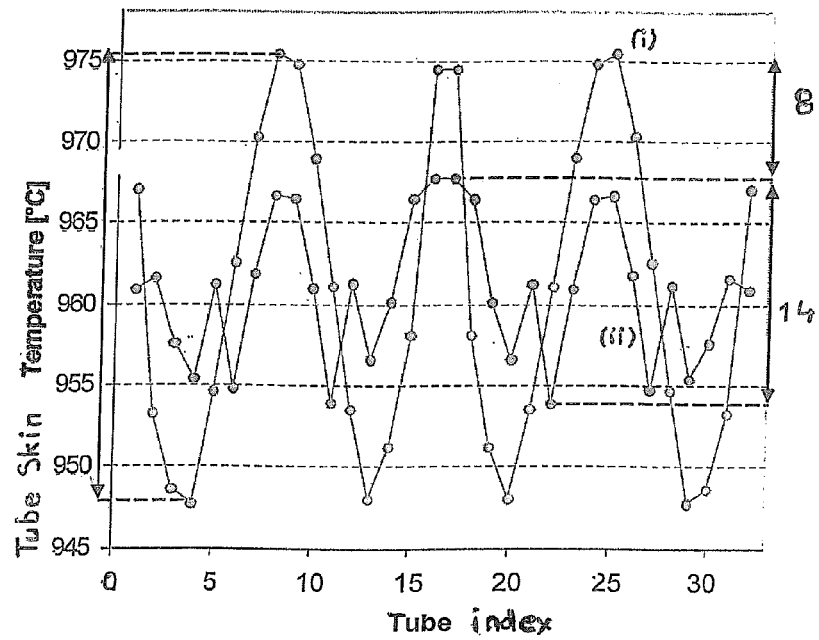
FIG. 6 illustrates the temperature profiles of the tubes without tuning (i) and after tuning (ii) according to certain embodiments of the invention.

FIG. 6 shows temperature profiles obtained by performing SMR3D simulations: (i) without tuning (same flow rate in each tube), and (ii) applying the tuning according to the invention (adjusted flow rates). Hot spots are visibly reduced.

Table 1 illustrates the homogenization of the tube temperatures.

| Tube temperatures | Ref | Tuned | Δ (Ref − Tuned) |
|---|---|---|---|
| Maximum temperature [° C.] | 976 | 968 | 8 |
| Diff Tmax-Tmin [° C.] | 28 | 14 | 14 |

Figure 7:
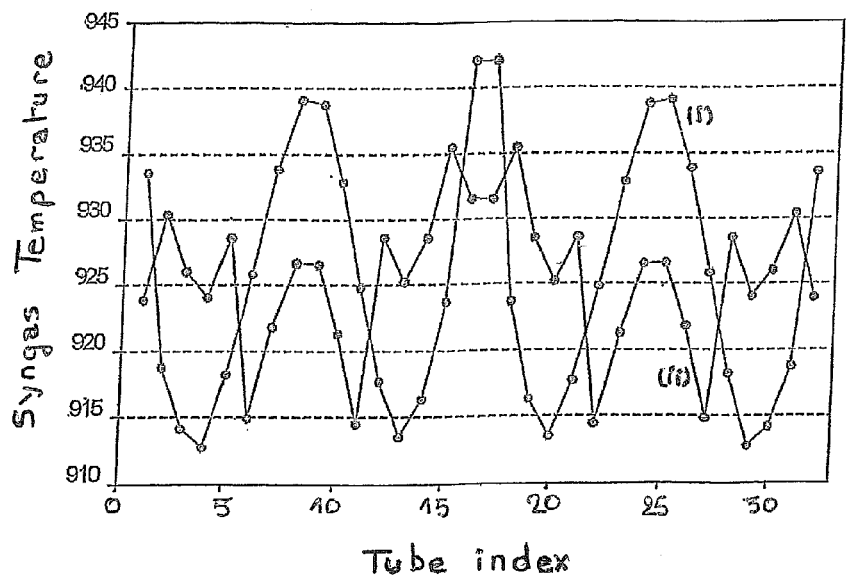
FIG. 7 illustrates the temperature profiles of the synthesis gas without tuning and with tuning according to the invention.

FIG. 7 shows the syngas temperature profile obtained by performing SMR3D simulations (i) without tuning (same flow rate in each tube), and (ii) applying the tuning according to the invention (adjusted flow rates) which show that hot spots are reduced.

Table 2 illustrates the homogenization of the syngas temperatures.

| Syngas temperatures | Ref | Tuned | Δ (Ref − Tuned) |
|---|---|---|---|
| Average syngas temperature [° C.] | 925 | 925 | 0 |
| Diff Tmax-Tmin [° C.] | 29 | 21 | 8 |

According to the simulation performed:

maximum tube temperature Tmax is reduced by 8° C.;

a good temperature homogenization is expected, temperature spread (Tmax−Tmin) is divided by two (28→14° C.);

there is no impact on syngas production flow rate and not noticeable impact on syngas temperature (925° C.).

This should allow increasing tube lifetime or running the furnace at higher temperature level, i.e. higher performances.

In this example, the solution of the invention utilized for individually controlling the flow rate inside the tubes is the implementation of differential pressure drop elements in the 50% identified cold tubes. This implementation is advantageous as it allows being self-adaptable to the furnace load.

A description of the solution that was chosen in the case of the example is provided below; various other technical solutions can be utilized to implement step c) of the invention, and several will also be briefly described later in the text.

The furnace of the example is a usual side fired furnace with process tubes individually attached to the common feed system header by means of welded connection piping (hereafter called hairpins).

In order to control the process gas flow rate distribution, calibrated orifices are installed in the 50% cold tubes in order to reach the desired pressure drop.

As illustrated in FIG. 8a to FIG. 8c, the device 811 generating the pressure drop is placed in the feed stream 812 from the hairpin, and fixed to the flange 813; a calibrated orifice 814 realizes the desired pressure drop. The solution consists here in a modification of the metallic support of the existing insulation block 815, which is for the purpose of the invention, prolonged beyond the hairpin connection. The orifice support is then maintained using the fixation screw 816. The tightness is realized below the hairpin connection using ceramic fiber seal 817.

The suitable additional pressure drop has been estimated using a simple fluid mechanics correlation to be 0.33 bar in present example case, which roughly corresponds to 0.33/2 additional pressure drop to the whole reformer system. This estimated value corresponds to the difference between the pressure drop induced by the tubes at high feed flow rate level and the tubes at low feed flow rate level.

The diameter of the calibrated orifice 814 has been determined using classical pressure drop laws, and checked by means of CFD simulations.

It will be understood that different types of devices are able to generate suitable pressure drop in the tubes.

Beside the one described here above, various devices may be proposed; some of them are suitable for being implemented in side-fired design fireboxes, others in top-fired design fired-box, others in both top and side-fired fireboxes, and any other type of tubular reformers.

Figure 9A:
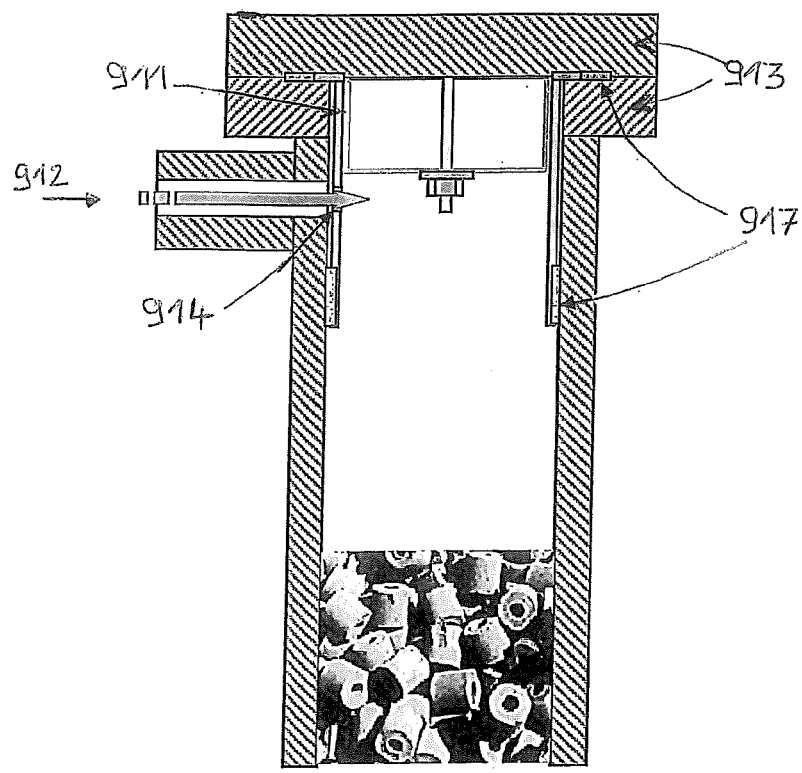
FIG. 9a and FIG. 9b illustrate a variant of a pressure drop device to be implemented in side fired furnaces.

As illustrated by FIG. 9a, according to a variant of the above device (suitable for side-fired firebox) where the desired pressure drop is also realized in front of the header by mean of a device placed in the feed stream from the hairpin and fixed to the flange, the calibrated orifice 914 is realized using a support 911 that is separated from the insulation support 915 and blocked between the flanges 913; the tightness is realized by using a ceramic fiber seal 917.

Figure 9B:
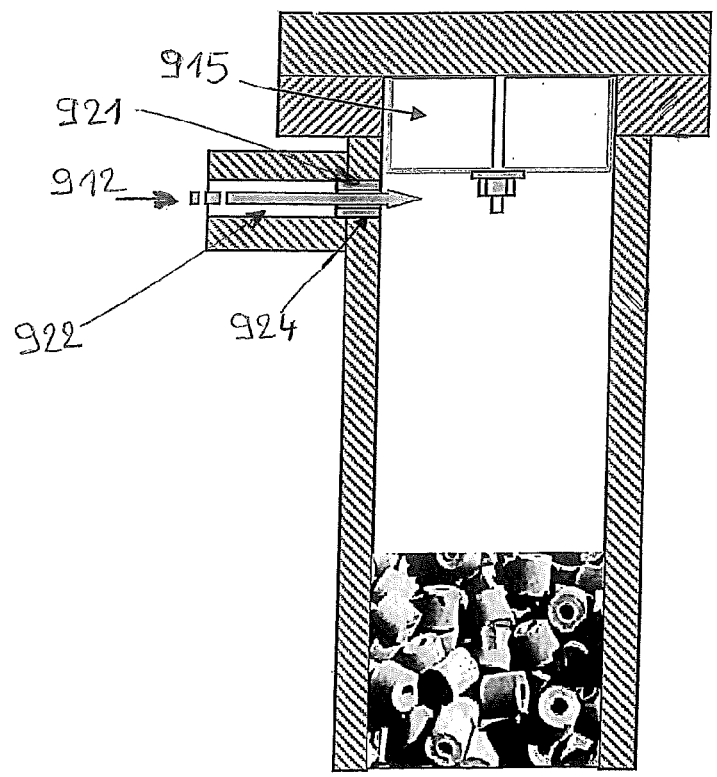

According to another variant illustrated by FIG. 9b, the pressure drop device 921 may be placed inside the hairpin duct 922, at the connection level. The desired pressure drop is obtained through a calibrated orifice 924; the device 921 may be welded or mounted using a tight fit (e.g. immersed in liquid nitrogen before being placed in the hairpin connection)

Figure 10:
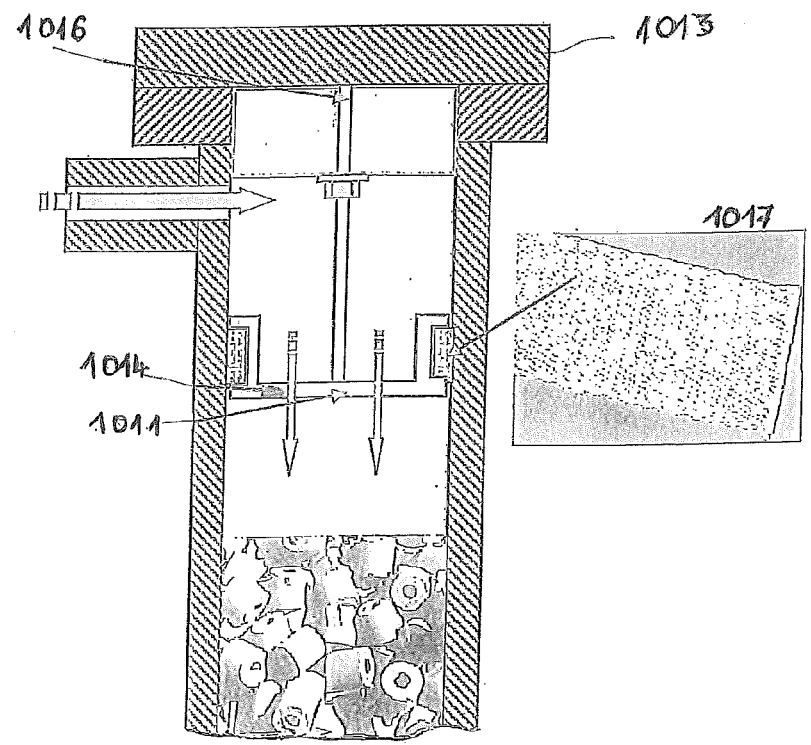

Alternatively, as illustrated in FIG. 10, the device generating the pressure drop may consist in a perforated plate 1011 with a determined number of calibrated orifices 1014 placed in the reforming tube stream; the plate may be suspended to the flange 1013 using the insulation fixation screw 1016, or using a specifically designed fixation to the flange, such as a welded metallic rod; at the orifice plate circumference, the tightness avoiding bypass around is obtained using a ceramic fiber fabric 1017 wrapped around the pressure drop device, constituting a seal.

Figure 11:
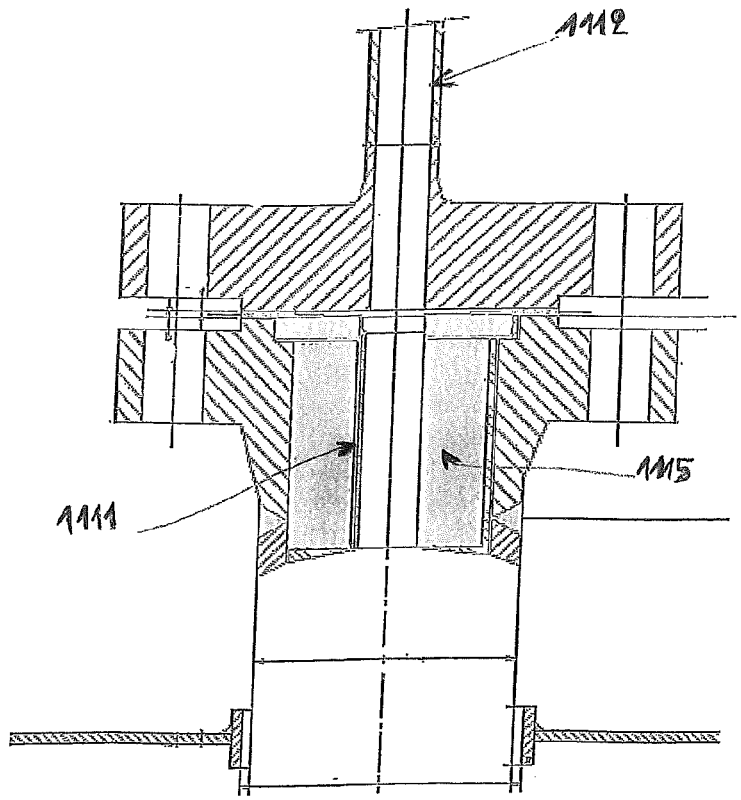

FIG. 11 illustrates a pressure drop device 1111 suitable to be implemented in top fired reformers, with an axial pigtail connection 1112 to the flange. The desirable pressure drop is obtained using calibrated orifice(s). This can be realized either by adjusting the diameter of the upper plate or by adjusting the diameter of the insulated block.

Figure 12A:
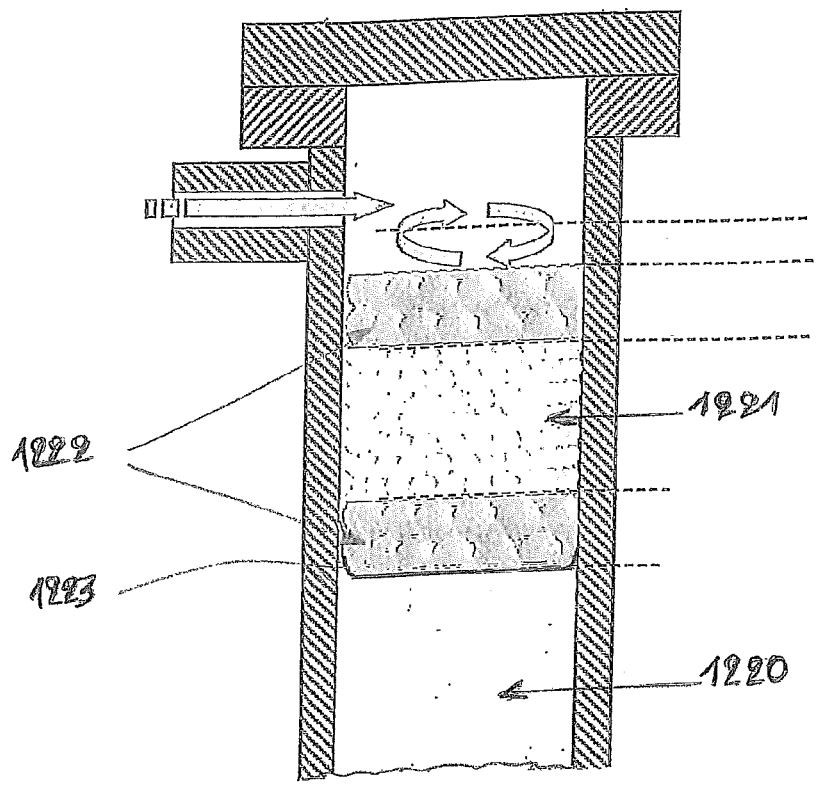
FIG. 12a and FIG. 12b illustrate alternative solution suitable for side and top fired furnaces.
Figure 12B:
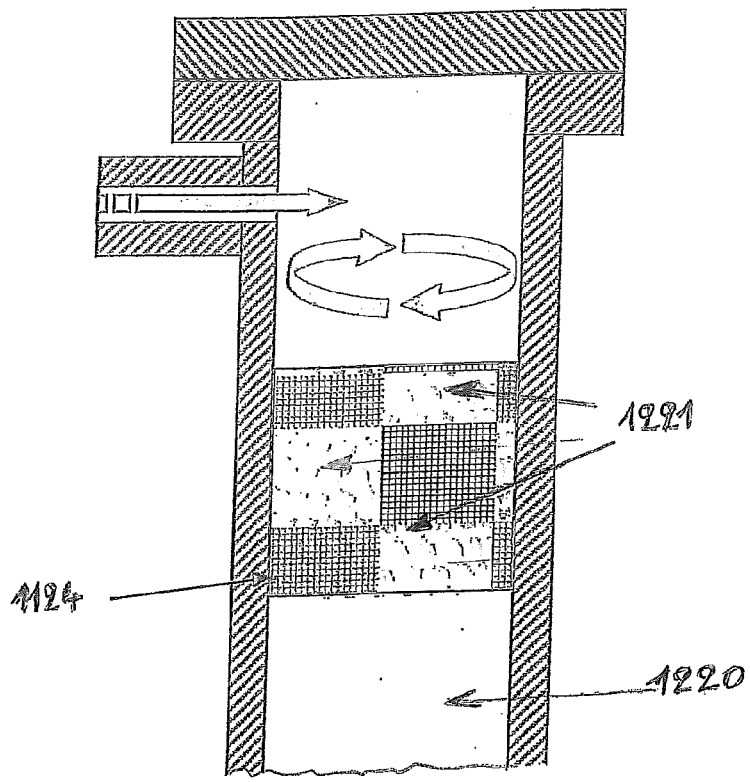

Still another way of adjusting the flow rate in the tubes, suitable for any type of tubular reformer, is to induce a desired pressure drop in tubes by the friction of the process fluid flowing inside porous media placed in the reforming tubes. Different behaviors in terms of pressure drop between tubes may be obtained by:

- filling the tubes with two different catalyst beds, which will imply two different behaviors in term of pressure drop; the tubes that have been identified as receiving too much duty, therefore needing to be cooled down, may be filled with conventional catalyst, and the tubes which have been identified as receiving insufficient duty, therefore needing to be heated up, may be filled either with a single type of catalyst pellets inducing an increased pressure drop or alternatively with catalyst pellets with different pressure drop characteristics used on a part of the tube length so as to adapt the pressure drop to the desired value;
- one can also imagine a single catalyst with a new pellet shape to be designed so as to reach the pressure drop and flow distribution specifications, or in case of a single catalyst in tubes, one can imagine filling the tube with more or less catalyst packed bed depending on the desired pressure drop and relative flow rate distribution As illustrated by FIG. 12a and FIG. 12b, still another way of inducing different behaviors in terms of pressure drop between tubes so as to adjust the process flow rate in tubes may be to add some layers of smaller ceramic beads above the reforming catalyst 1220 in the tubes which request a lower flow rate, the other tubes may remain not completed, therefore implying two different behaviors in terms of pressure drop. The additional layers 1221 may be placed in the free space available above the reforming catalysts. The diameter of the additional beads may be adjusted so that the expected pressure drop is reached. In order to prevent the small diameter beads to fall down due to large interstitial remaining space between the reforming catalyst pellets, and/or to be entrained by the high velocity injection of the feed flow, and consequently undergo attrition, different options may be used. As an example, high pressure drop beads may be placed in between two layers 1222 of larger diameter ceramic balls, such as depicted in FIG. 12a, where the capping layer 1222 aims at avoiding small spheres entrainment by feed injection, the interface layer between small beads and catalyst pellets aims at limiting the particles to fall in the reforming catalyst bed, a stainless steel separation 1223 mesh may be also placed below the interface layer to ensure the small beads stays on top of catalysts. According to another option, the high pressure drop beads 1221 may be placed in a stainless steel grid basket 1224 such as illustrated in FIG. 12b so as to prevent the beads 1221 from falling down in the reforming catalyst bed 1220.

Among the many advantages that ensue from the method of the invention are the following:

- the invention allows reducing maximum tubes temperature, and consequently increases their lifetime;
- the invention may also allow increasing the furnace efficiency; indeed, with a hotter furnace, better performances are obtained. As the fireboxes operation is limited by the hottest tube, once the temperature spread between tubes is reduced, the process may be operated at a higher average temperature;
- the invention is particularly advantageous in the case of steam methane reforming for CO production where the influence of temperature on efficiency is very important.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A method to homogenize the tube temperatures between tubes in a process involving the heating of at least one fluid in a furnace that contains at least one radiation chamber with radiant walls, at least one essentially vertical row of tubes inside of which circulate the at least one fluid to be heated, and whereby said radiation chamber is equipped with burners that are used in the form of rows, whereby the at least one fluid to be heated is distributed uniformly to the tubes, and whereby the burners heat the tubes, the method comprising the steps of:
   a) determining the temperature of each tube;
   b) selecting the 50% tubes having the lowest temperatures as determined according to step a);
   c) realizing on each tube selected during step b) an operation that decreases the flow of the fluid distributed, entering in said tube; and
   d) keeping the total flow rate of the fluid unchanged, therefore distributing uniformly increased flow to the remaining tubes.

2. The method according to claim 1, wherein the temperatures of the tubes are determined by a simulation of the behavior of the furnace during said process involving the heating of at least one fluid.

3. The method according to claim 1, wherein the temperatures of the tubes are determined by measuring the skin temperature of the tubes by pyrometer measurement.

4. The method according to claim 1, wherein the operation realized on the tubes selected during step b) comprises increasing the pressure drop of said 50% tubes having the lowest tube temperatures.

5. The method according to claim 4, wherein the pressure drop is increased by installing elements in each of the individual tubes having the lowest temperature selected in step b), said elements that induces pressure drop being sized so that the flow distribution is the one required by step d) of the method.

6. The method according to claim 5, wherein the process uses tubes filled with catalyst.

7. The method according to claim 5, wherein said elements installed to increase the pressure drop are elements based on calibrated orifices that are installed at the inlet of the tube.

8. The method according to claim 6, wherein said elements installed in each of the individual tubes selected in step b) are individually adjusted catalyst packed bed inside the tubes, including additional catalyst bed height.

9. The method according to claim 8, wherein said elements installed in each of the individual tubes selected in step b) are individually filled catalyst packed bed inside the tubes with part of the catalyst packed bed height composed of a different kind of pellets with higher pressure drop characteristics relatively to the catalyst filled in the non selected tubes.

10. The method according to claim 1, wherein the process is a synthesis gas production process by steam methane reforming of a hydrocarbon feedstock using tubes filled with catalyst and where the at least one fluid distributed uniformly to the tubes is a mixture containing at least said hydrocarbon feedstock together with steam.

* * * * *